United States Patent
Cohen et al.

(10) Patent No.: US 9,582,677 B2
(45) Date of Patent: Feb. 28, 2017

(54) DYNAMIC STORLETS IN STORAGE SYSTEM DATA PATH

(71) Applicant: International Business Machines Corporation, Armonk, NY (US)

(72) Inventors: Simona Cohen, Haifa (IL); Ealan Abraham Henis, Rehovot (IL); John Michael Marberg, Haifa (IL); Kenneth Nagin, Mitzpeh Hoshiya (IL)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 14/184,722

(22) Filed: Feb. 20, 2014

(65) Prior Publication Data

US 2015/0235044 A1    Aug. 20, 2015

(51) Int. Cl.
  *G06F 21/00* (2013.01)
  *G06F 21/62* (2013.01)
  *G06F 21/53* (2013.01)

(52) U.S. Cl.
  CPC .......... *G06F 21/6218* (2013.01); *G06F 21/53* (2013.01)

(58) Field of Classification Search
  USPC .......................................................... 726/17
  See application file for complete search history.

(56) References Cited

U.S. PATENT DOCUMENTS

| | | | | |
|---|---|---|---|---|
| 6,735,771 B1 * | 5/2004 | Houlding | ................ | G06F 9/465 719/315 |
| 7,130,863 B2 * | 10/2006 | Diab | ........................ | G06F 8/24 |
| 7,171,566 B2 | 1/2007 | Durrant | | |
| 8,074,229 B2 * | 12/2011 | Brunswig | ................ | G06F 9/455 719/312 |
| 2003/0144894 A1 * | 7/2003 | Robertson | .............. | G06Q 10/06 709/226 |
| 2009/0183199 A1 * | 7/2009 | Stafford | ............... | H04H 60/375 725/34 |
| 2009/0268903 A1 | 10/2009 | Bojinov et al. | | |
| 2011/0219109 A1 * | 9/2011 | Zehavi | .............. | H04L 29/08729 709/223 |
| 2011/0235799 A1 * | 9/2011 | Sovio | ...................... | H04L 9/083 380/30 |
| 2011/0238985 A1 * | 9/2011 | Sovio | ................. | H04N 21/2347 713/168 |

(Continued)

OTHER PUBLICATIONS

Nightingale et al., "Flat Datacenter Storage", in 10th USENIX Symposium on Operating Systems Design and Implementation (OSDI 2012), Oct. 2012.

(Continued)

*Primary Examiner* — Mahfuzur Rahman
(74) *Attorney, Agent, or Firm* — Lance I. Hochhauser (57) ABSTRACT

Machines, systems and methods for dynamically implementing storlets in a storage data path. The method comprises receiving a request to perform a storage-related function on data stored on a first data storage medium in a data storage system; verifying the request by way of an authentication and authorization mechanism to prevent unauthorized access to data stored on the first data storage medium in the data storage system; and utilizing a storlet to service the request, wherein the storlet is dynamically deployed on a node in the data storage system such that the node has sufficient resources to support the storlet to service the request.

15 Claims, 4 Drawing Sheets

Computing Environment 100

(56) References Cited

U.S. PATENT DOCUMENTS

| | | | | |
|---|---|---|---|---|
| 2012/0316846 A1* | 12/2012 | Cohen | ............... | G11B 27/002 |
| | | | | 703/2 |
| 2014/0023340 A1* | 1/2014 | Civiletto | ............ | H04N 21/2181 |
| | | | | 386/239 |
| 2014/0059187 A1* | 2/2014 | Rosset | ................... | G06F 13/14 |
| | | | | 709/220 |
| 2014/0337875 A1* | 11/2014 | Dankberg | .......... | H04N 21/4784 |
| | | | | 725/23 |
| 2015/0067171 A1* | 3/2015 | Yum | ................. | H04L 67/2809 |
| | | | | 709/226 |
| 2015/0237021 A1* | 8/2015 | Sovio | ............... | H04L 63/0428 |
| | | | | 713/168 |

OTHER PUBLICATIONS

Factor et al., "Preservation DataStores: Architecture for Preservation Aware Storage," in MSST 2007: Proceedings of the 24th IEEE Conference on Mass Storage Systems and Technologies, (San Diego, CA), Sep. 2007.

Rabinovici-Cohen et al., "Preservation DataStores in the Cloud (PDS Cloud): Long Term Digital Preservation in the Cloud", IBM Research, Technical Paper H-0318, 2013.

Kolodner et al., "A Cloud Environment for Data-intensive Storage Services", IEEE Third International Conference on Cloud Computing Technology and Science (CloudCom), Nov.-Dec. 2011, pp. 357-366.

Kolodner et al., "Virtualized Storage Services Foundation for the Future Internet", IBM reserach Haifa, Vision Cloud, Deliverable D10.2, High Level Architectural Specification, Release 1.0, Jul. 2011.

* cited by examiner

DYNAMIC STORLETS IN STORAGE SYSTEM DATA PATH

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to dynamic deployment and usage of storlets in the data path of a storage system, and particularly to a data storage system in which special purpose storlets are executed close to the location of the target data.

BACKGROUND

In a client-server architecture, a client machine submits data requests to a server system over a communications network. In response to receiving a request, the server locates target data stored on a storage system and transfers a copy of the data from the server to the client, where the data is processed by a computing processor unit (CPU) on the client.

In some cases the result of data processing performed on a client node is returned to the server to update the storage system records. The above data transfer regiment can result in the generation of a substantial amount of network traffic and congestion, if large volumes of data are being transferred between the clients and the servers.

Advanced storage systems have been developed with locally available computing resources (e.g., CPU, memory, etc.). The storage-side local resources may not be fully utilized at all times. To help reduce network congestion, it is desirable to utilize these resources to process data that would otherwise be transferred to a client node for processing.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for dynamically implementing storlets in a storage data path is provided. The method comprises receiving a request to perform a storage-related function on data stored on a first data storage medium in a data storage system; verifying the request by way of an authentication and authorization mechanism to prevent unauthorized access to data stored on the first data storage medium in the data storage system; and utilizing a storlet to service the request, wherein the storlet is dynamically deployed on a node in the data storage system such that the node has sufficient resources to support the storlet to service the request.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
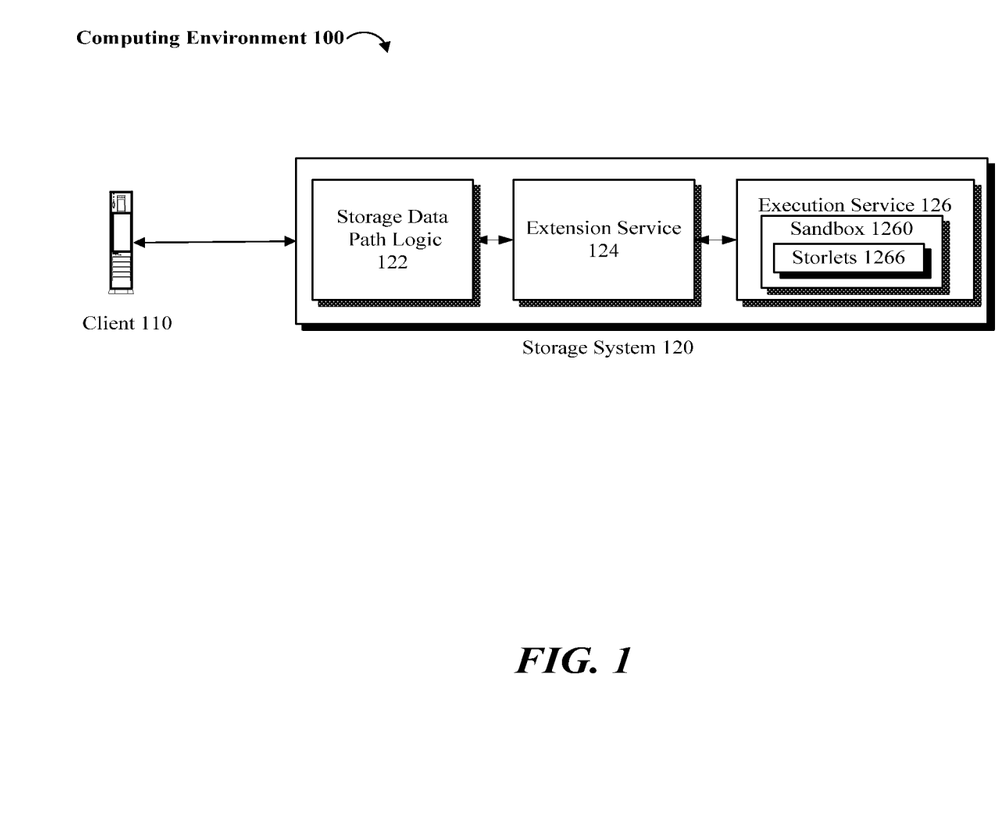
FIG. 1 illustrates an exemplary computing environment, in accordance with one or more embodiments, in which client requests are serviced by a storlet in a data storage system.

Referring to FIG. 1, an exemplary computing environment 100 is illustrated in which a client node 110 communicates with a storage system 120. Storage system 120 may comprise proxy nodes and object nodes, where a node has a data path logic 122, an extension service 124 and an execution service 126. The storage data path logic 122 on a proxy node of storage system 120 may perform client authentication and authorization services for requests received from the client 110. Authentication of a request helps ensure the identity of the client 110 is valid, and authorization verifies the client has access rights to resources specified in the request. The storage data path logic 122 on an object node of storage system 120 may be responsible for the actual retrieval of the data of the object in the request.

Extension service 124 may run on the proxy node or the object node (or both) and may be utilized to determine whether the request may be processed by an application (e.g., storlet) that is locally running at the proxy node or at the storage object node. The extension service 124 may have intelligent logic and access to mapping data to determine which proxy node or storage object node is a good candidate (e.g., has the adequate level of CPU or memory resources) to service the request. The extension service 124 may communicate with an execution service 126 running on a proxy node or a storage object node to execute the storlet. The execution service 126 may comprise one or more sandboxes 1260 and one or more storlets 1266 running within the sandboxes 1260.

The extension service 124 may be implemented to select a proxy node or a storage object node that is, for example, closest to the data storage medium where the target data is stored and cause execution service 126 to execute one or more storlets 1266 on the selected node. The execution service 126 may manage a sandbox 1260 which may be configured to limit the functionality of the storlet 1260 based on parameters passed to the selected node by the proxy node. The parameters may define the privileges associated with a request that is to be serviced by the storlet 1266. Additional details and considerations about the location of execution of the storlets are provided in further detail below in application to one or more exemplary embodiments.

Figure 2:
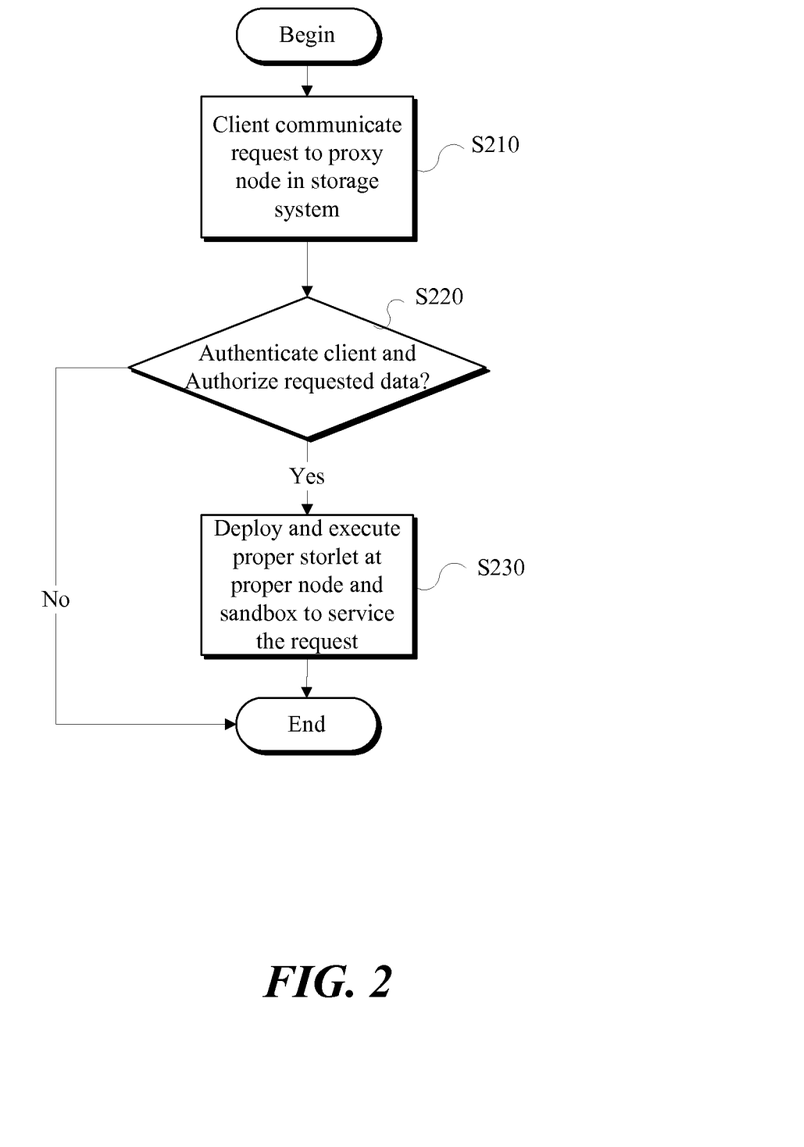
FIG. 2 is an exemplary block diagram of a method of servicing a client request in a data storage system using a dynamic storlet, in accordance with one embodiment.

Referring to FIG. 2, in accordance with one embodiment, a client node 110 may communicate a request to a proxy node in the storage system 120 (S210). The proxy node may be in communication with one or more storage object nodes in storage system 120. The proxy nodes or the storage object nodes may be commodity servers equipped with computing resources (e.g., CPU power, memory capacity, etc.) that are more powerful in terms of resources than a traditional storage sever, and thus have sufficient resources to process certain requests in close proximity to where the data is stored, thereby avoiding the need for data transfer across the network for the client node 110 to process the data, for example.

In one implementation, the functionality related to storage data path logic 122 may be augmented with extension service 124. As noted earlier, the storage data path logic 122 may be configured for determining whether a request submitted by a client 110 is authentic and whether the sender of the request has sufficient authorization to access the requested data (S220). The storage data path logic 122 may also retain information about the location or the node on which the requested data is stored. The extension service 124 determines which storlet 1266 is proper for performing a requested function, and where or in which node the storlet is to be deployed and executed (S230).

In a particular embodiment, extension service 124 is added to the storage data path logic 122 at intercept points to perform a call (e.g., a hypertext transfer protocol (HTTP) call) to the execution service 126 for the purpose of executing a storlet 1266 in a sandbox 1260. The extension service 124 may be thus tied to the storage data path logic 122 of the proxy server or of the object server. If that server utilizes a web server gateway interface (WSGI) framework (e.g., OpenStack Swift), for example, then the extension service 124 may be a WSGI middleware that intercepts HTTP requests. The execution service 126 may be platform independent and reside in, for example, the proxy node, or the storage object node.

For example, the extension service 124 may determine that the request is for performing an analysis on data that is stored on multiple storage object nodes. For optimization, it may be desirable to determine whether it is more appropriate or practical for the requested data to be transferred to the proxy for analysis, or whether the data may be separately analyzed at each of the storage object nodes. In one example scenario, the extension service 124 (running on the proxy) may determine that the computing resources at the proxy node are better suited to process the data. If so, then the target data is transferred to the proxy node from the storage object nodes and the execution service 126 is provided at the proxy level (e.g., by way of deploying and executing one or more storlets 1266 on the proxy).

In contrast, if extension service 124 determines that one or more storage object nodes are more suitable for processing the data, then the execution service 126 is provided at the one or more storage object nodes (e.g., by way of deploying one or more storlets 1266 on the storage object node). In this manner, the data processing is advantageously performed at a level that is more local (i.e., at the storage object node vs. the proxy node) to the location of storage of the target data. This localized processing of the data by way of locally deployed storlets 1266 helps avoid the need for data transfer from the storage object nodes to the proxy node, easing the traffic across the storage network.

In addition to freeing up transmission bandwidth over the storage network, the above implementation would also allow for the use of processing power, memory and other resources that are available at the local data storage object node level or the proxy level, where such resources may be otherwise underutilized or wasted. The execution service 126 at the storage object node level or at the proxy level may be configured to process the client request based on the privileges (e.g., read, write, modify) and limitations (e.g., resource usage limitations) associated with the client request.

For example, the execution service may determine the privileges and limitations of a request based on parameters submitted with or embedded in the data packets that carry the request to the proxy node or the data storage object node from the client. The parameters submitted may for example define the following exemplary attributes associated with a request:

Event—the event type for a storlet. Example event values can be:
1. deploy—used to dynamically deploy a new storlet and enable its execution
2. execute first—used to execute the storlet as the first step in the data operation
3. execute last—used to execute the storlet as the last step in the data operation
4. undeploy—used to undeploy the storlet and remove the ability to execute it Node—the node for the storlet event. Example values can be:
1. interface—perform the storlet event on the interface proxy node
2. local—perform the storlet event on the local storage object node that holds the data object Storlet Id—the unique identifier of the storlet Storlet Parameters—the input parameters to the storlet Sandbox Type—ranges from Admin Sandbox (if the storlet is allowed to perform all operations), to User Sandbox (in which the storlet operations are very restricted). Additional sandbox types can be in-between.

Depending on implementation, deployment and execution of storlets may vary as either dependent or independent on other storlets. In other words, a request for deploying or undeploying a storlet (e.g., a deploy/undeploy event) may be separate from a request for executing a storlet (e.g., execute first/execute last event). Certain storlet functionality at the execution service 124 may be controlled by storage data path logic 122.

For example, when a request is processed by the storage data path logic 122, a rule associated with the request may be triggered that would cause the initiation of storlet execution in the data-path as performed when initiated by the client 110. The triggering of the rule may be transparent to the client 110 as the format of request may not require any special additional storlet parameters and may apply to any normally formed request. In one implementation, a rules handler in the storage data path logic may be configured to manage the rules and the related triggering.

Depending on implementation, information fields (e.g., extension fields) may be include in requests submitted by client 110 to specify required capabilities provided by the extension service 124. The information fields dynamically specify how to define a new storlet, what storlet computation to run, and provide details of how to run the storlet. For example, if the client 110 requests use HTTP REST web services format, the information for the extension fields may be added in the query string or in the headers. If, for example, the client 110 requests the use of HTTP SOAP web services, the information for the extension fields may be added as parameters in the methods. If understanding of the information fields and the related options may be difficult for an end user, certain rules and default behaviors may be implemented to reduce complexity to the end user.

In the following an exemplary scenario as related to data access and retrieval in an image processing application is provided to help better introduce the concepts and methodology provided in this disclosure. It is noteworthy, however, that this exemplary scenario should not be narrowly construed to limit the scope of the claimed subject matter to the specific details or embodiment. In one example, a request may be submitted to a medical data storage system to view a portion of a medical image (e.g., a CT Scan) in the highest resolution available. The request may include parameters that identify the specific portion of the image that is of interest.

When a proxy node receives the request from the client 110, storage data path logic 122 executed on the proxy node authenticates and authorizes the request. Upon successful authentication and authorization, the extension service 124 executed on the proxy node determines whether there is a storlet available to service the request and determines which storage object nodes in storage system 120 are proper candidates for deploying the storlet. Desirably, extension service 124 selects the storage object node that is closest to the data to execute the storlet. In one embodiment, the execution service may deploy the storlets on the proxy node, if data stored on several storage object nodes has to be retrieved into the proxy node for the purpose of processing.

Extension service 124 may communicate with the execution service 126 running on the selected storage object node to retrieve the requested part of the image (i.e., not the entire image). Extension service 126 may also use rules with particular triggers (e.g., rule=all objects in specific container will be transformed on access to pdf via a Transformation-Storlet). It is noteworthy that the execution service 126 may execute multiple storlets in the proxy nodes or the storage object nodes, depending on implementation and suitability of the nodes.

In one or more embodiments, the execution service 126 manages the sandbox 1260. The sandbox 1260 is implemented to limit the functionality of the storlet based on the parameters passed to the storage object node by the proxy node. The parameters may define the privileges for the storlet execution. Sandbox 1260 may define for example the ports that are available, limit amount of storage capacity, memory and CPU resources available to the storlet. The privileges and the control over the sandbox 1266 may be provided by a human operator.

Advantageously, the above implementations help provide a generic architecture in which the execution service may reside in any network node, whether a proxy node or the storage object node. This approach enables the optimization of placement of the execution service taking in account which node has unutilized compute power and free network bandwidth. Further, storlets may be dynamically deployed and executed code within the data path of a submitted request, leveraging existing security mechanisms (e.g. Keystone authentication in Swift). Dynamic configuration of the storlet parameters may be also supported in one or more embodiments, such that for the same data, different storlets may be executed with different input parameters in different sandboxes. The input parameters may vary from one client to another and from one request to another, for example.

Accordingly, storlets or other computational modules in the storage system 120 may be generically defined, deployed and executed, and persist within a selected data path. Certain embodiments provide a general purpose configurable computational mechanism that uses the data path rather than a separate messaging network (such as in RPC). General purpose computation may be supported in contrast to known mechanisms in the data path that leverage only specific predefined computations (e.g., SVC, de-duplication, HSM, encryption, etc.), as storlets may be dynamically defined and deployed. The above mechanism thus advantageously leverages existing data path authentication/authorization/security mechanisms that penetrate deep into the storage system 120 lower layers and may also leverage the existing data path optimized access methods to the various objects in the storage.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 3:
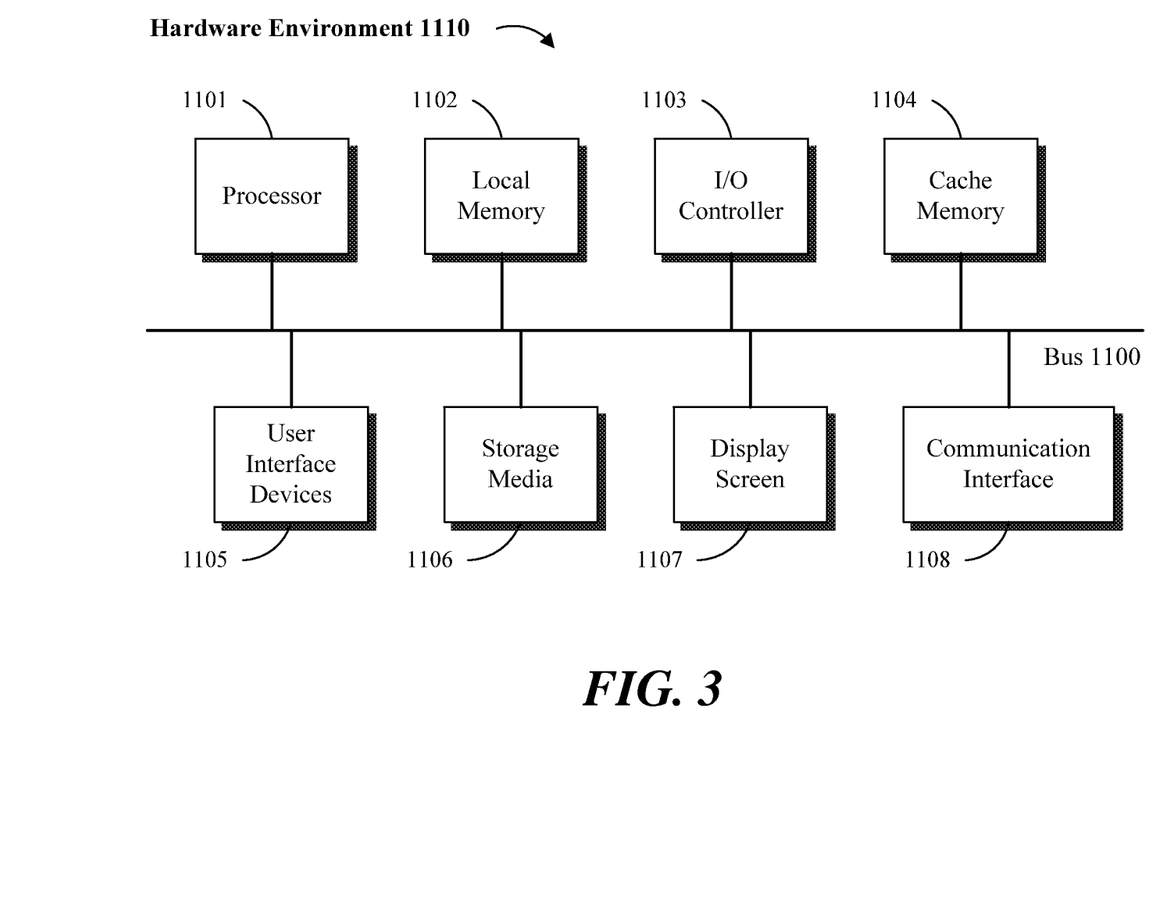
FIGS. 3 and 4 are block diagrams of hardware and software environments in which the disclosed systems and methods may operate, in accordance with one or more embodiments.
Figure 4:
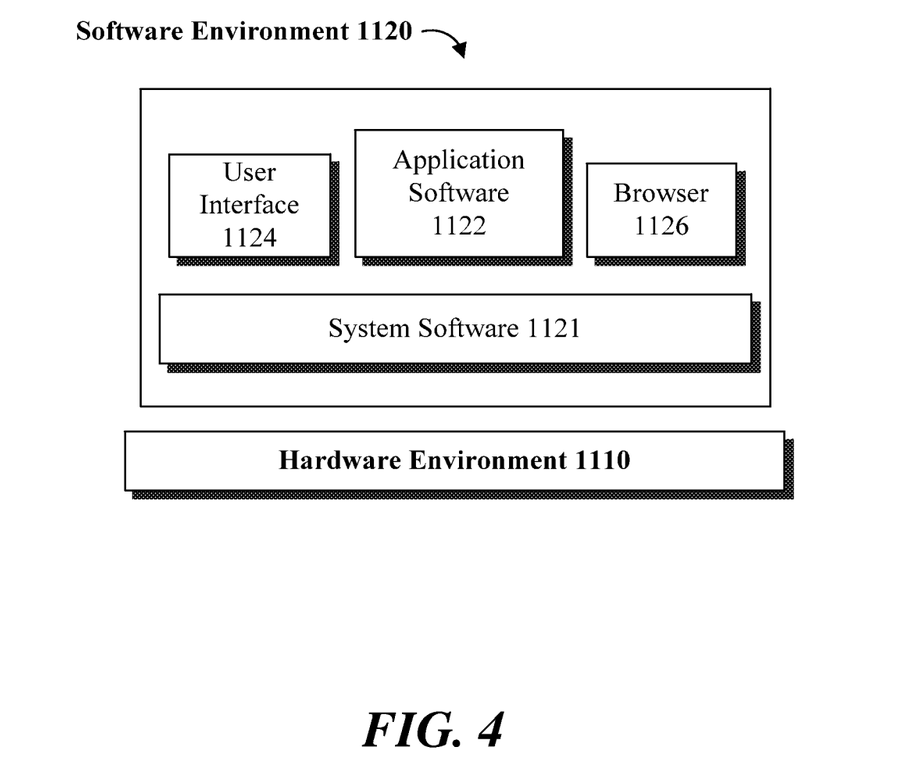

Referring to FIGS. 3 and 4, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 3, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method of implementing storlets in a storage system, the method comprising:
    transmitting, by a processor, a request to perform a storage-related function on a data object stored on a first storage medium in the storage system, wherein in the request, one or more rules are defined for dynamic association of the data object with:
    a storlet;
    the storlet's parameters; and
    the storlet's sandbox environment;
    verifying, by the processor, the request by way of an authentication and authorization mechanism to prevent unauthorized access to the data object stored on the first storage medium in the storage system; and performing, by the processor,
the storage-related function on the data object, wherein performing the storage-related function comprises:
intercepting, by an extension service running on a proxy node, the request to perform the storage-related function on the data object;
dynamically deploying, by the extension service, the storlet on a node in the storage system such that the node has sufficient resources to support the storlet to service the request; and
executing the storlet in the sandbox environment, wherein:
the sandbox environment is allocated by the extension service based on the one or more rules defined in the request.

2. The method of claim 1 wherein a storage data path logic performs the authentication and authorization.

3. The method of claim 1 wherein the sandbox environment isolates the storlet from accessing:
data for which the request is not authorized to access; and
resources for which the request is not authorized to utilize.

4. The method of claim 1 wherein the storlet is dynamically deployed on the storage node that is adjacent to a location of the first storage medium such that the storlet is considered to be locally situated with respect to the location of the first storage medium.

5. The method of claim 1 wherein the storlet performs the storage-related function on the data object as the data associated with the data object is stored or retrieved from the storage system.

6. A system comprising:
a processor set; and
a computer readable non-transitory storage medium; wherein:
the processor set is structured, located, connected, and/or programmed to run instructions stored on the computer readable storage medium; and
the program instructions, which, when executed by the processor set, cause the processor set to implement storlets in a storage system by:
transmitting a request to perform a storage-related function on a data object stored on a first storage medium in the storage system, wherein in the request, one or more rules are defined for dynamic association of the data object with:
a storlet;
the storlet's parameters; and
the storlet's sandbox environment;
verifying the request by way of an authentication and authorization mechanism to prevent unauthorized access to the data object stored on the first storage medium in the storage system; and
performing the storage-related function on the data object, wherein performing the storage-related function on the data object further comprises:
intercepting, by an extension service running on a proxy node, the request to perform the storage-related function on the data object;
dynamically deploying, by the extension service, the storlet on a node in the storage system such that the node has sufficient resources to support the storlet to service the request; and
executing the storlet in the sandbox environment, wherein:
the sandbox environment is allocated by the extension service based on the one or more rules defined in the request.

7. The computer system of claim 6 wherein a storage data path logic performs the authentication and authorization.

8. The computer system of claim 6 wherein the sandbox environment isolates the storlet from accessing:
data for which the request is not authorized to access; and
resources for which the request is not authorized to utilize.

9. The computer system of claim 6 wherein the storlet is dynamically deployed on the storage node that is adjacent to a location of the first storage medium such that the storlet is considered to be locally situated with respect to the location of the first storage medium.

10. The computer system of claim 6 wherein the storlet performs the storage-related function on the data object in the storage system as the data associated with the data object is stored or retrieved from the storage system.

11. A computer product comprising a non-transitory data storage medium having a computer readable program and program instructions stored on said non-transitory data storage medium, said program instructions comprising instructions to:
transmit a request to perform a storage-related function on a data object stored on a first storage medium in a storage system, wherein in the request, one or more rules are defined for dynamic association of the data object with:
a storlet;
the storlet's parameters; and
the storlet's sandbox environment;
verify the request by way of an authentication and authorization mechanism to prevent unauthorized access to the data object stored on the first storage medium in the storage system; and
perform the storage-related function on the data object, wherein performing the storage-related function on the data object further comprises instructions to:
intercept, by an extension service running on a proxy node, the request to perform the storage-related function on the data object;
dynamically deploy, by the extension service, the storlet on a node in the storage system such that the node has sufficient resources to support the storlet to service the request; and
execute the storlet in the sandbox environment, wherein:
the sandbox environment is allocated by the extension service based on the one or more rules defined in the request.

12. The computer program product of claim 11 wherein a storage data path logic performs the authentication and authorization.

13. The computer program product of claim 11 wherein the sandbox environment isolates the storlet from accessing:
data for which the request is not authorized to access; and
resources for which the request is not authorized to utilize.

14. The computer program product of claim 11 wherein the storlet is dynamically deployed on the storage node that is adjacent to a location of the first storage medium such that the storlet is considered to be locally situated with respect to the location of the first storage medium.

15. The computer program product of claim 11 wherein the storlet performs the storage-related function on the data object in the storage system as the data associated with the data object is stored or retrieved from the storage system.

* * * * *